United States Patent
Gujarathi

(10) Patent No.: US 10,936,639 B2
(45) Date of Patent: Mar. 2, 2021

(54) ENHANCE A MAIL APPLICATION TO FORMAT A LONG EMAIL CONVERSATION FOR EASY CONSUMPTION

(71) Applicant: Citrix Systems, Inc., Fort Lauderdale, FL (US)

(72) Inventor: Ashish Gujarathi, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 75 days.

(21) Appl. No.: 16/232,416

(22) Filed: Dec. 26, 2018

(65) Prior Publication Data
US 2020/0210463 A1 Jul. 2, 2020

(51) Int. Cl.
| | |
|---|---|
| G06F 17/00 | (2019.01) |
| G06F 16/335 | (2019.01) |
| H04L 12/58 | (2006.01) |
| G06F 16/93 | (2019.01) |
| G06F 40/258 | (2020.01) |
| G06F 40/279 | (2020.01) |

(52) U.S. Cl.
CPC ........... *G06F 16/335* (2019.01); *G06F 16/93* (2019.01); *G06F 40/258* (2020.01); *G06F 40/279* (2020.01); *H04L 51/063* (2013.01); *H04L 51/08* (2013.01); *H04L 51/16* (2013.01)

(58) Field of Classification Search
None
See application file for complete search history.

(56) References Cited

U.S. PATENT DOCUMENTS

| | | | |
|---|---|---|---|
| 7,509,382 B1 * | 3/2009 | Jania | H04L 12/1831 709/206 |
| 8,533,274 B2 * | 9/2013 | Buchheit | G06Q 10/107 709/206 |
| 8,977,653 B1 * | 3/2015 | Mahkovec | G06F 16/957 707/802 |
| 2003/0110227 A1 * | 6/2003 | O'Hagan | G06Q 10/107 709/206 |
| 2007/0282956 A1 * | 12/2007 | Staats | H04L 51/22 709/206 |
| 2008/0052633 A1 * | 2/2008 | Kubo | G06Q 10/107 715/752 |
| 2008/0162651 A1 * | 7/2008 | Madnani | G06Q 10/107 709/206 |
| 2009/0037407 A1 * | 2/2009 | Yang | G06Q 10/107 |
| 2009/0204903 A1 * | 8/2009 | Edelen | G06Q 10/107 715/752 |

(Continued)

*Primary Examiner* — Mustafa A Amin
(74) *Attorney, Agent, or Firm* — Foley & Lardner LLP

(57) ABSTRACT

System and methods discussed for automatically generating conversation-based reports from email threads for easier and more intuitive user-consumption may include a parser, configured to identify all related emails, extract relevant portions of each email including embedded or in-line comments within quoted portions, and generate a single report document that presents the conversation in chronological order. Duplicate portions of each email are automatically removed and excluded from the report, reducing memory and bandwidth requirements, and also making the report more intuitive and easier to read. Attachments to the email may be included in the report, with additional deduplication to further reduce memory and bandwidth requirements.

17 Claims, 5 Drawing Sheets

(56) References Cited

U.S. PATENT DOCUMENTS

| | | | |
|---|---|---|---|
| 2009/0282086 A1* | 11/2009 | Heimes | G06F 16/9024 |
| 2010/0023583 A1* | 1/2010 | Carmel | G06Q 10/107 |
| | | | 709/206 |
| 2010/0306185 A1* | 12/2010 | Smith | G06F 16/275 |
| | | | 707/709 |
| 2011/0099242 A1* | 4/2011 | Madnani | H04L 51/12 |
| | | | 709/206 |
| 2013/0124548 A1* | 5/2013 | Chhaparia | G06F 16/245 |
| | | | 707/758 |
| 2017/0124034 A1* | 5/2017 | Upadhyay | G06F 40/289 |

* cited by examiner

| From | Subject | Date/Time |
|---|---|---|
| Al | Re: project design | 1/2/2018 2:00 PM |
| Bob | Re: project design | 1/2/2018 1:00 PM |
| Cathy | Re: project design | 1/2/2018 12:00 PM |
| Bob | Re: project design | 1/1/2018 3:00 PM |
| Dave | Re: project design | 1/1/2018 2:00 PM |
| Al | Re: project design | 1/1/2018 1:00 PM |

From: Al
Date: 1/2/2018 2:00 PM
To: Bob, Cathy, Dave　⎬ 203
CC: Eric, Fred
Subject: Re: project design Sounds good. Answers in line below.　⎬ 206
218 ─ ~Al
　　　　214

> From: Bob
> Date: 1/2/2018 1:00 PM
210 ─ > To: Al, Cathy, Dave
> CC: Eric, Fred
> Subject: Re: project design > We're thinking of changing the design. Let me know what you
> think about these colors:
> Red
Not my first choice
216 ─ > Blue
I like this one >> From: Cathy
>> Date: 1/2/2018 12:00 PM
212 ─ >> To: Al, Bob, Dave
>> CC: Eric, Fred
>> Subject: Re: project design >> Attached is the latest version of the design
○
○
○

Conversation Report on "project design"

252A — Al @ 1/2/2018 2:00 PM
254A — Sounds good. Answers in line below.
Bob: Red
   Not my first choice — 256
Bob: Blue
258 — I like this one 252B — Bob @ 1:00 PM
254B — We're thinking of changing the design. Let me know what you think about these colors:

252C — Cathy @ 1/2/2018 12:00 PM
254C — Attached is the latest version of the design 260 — Attachment1.pptx   Attachment2.pdf

*FIG. 2C*

ENHANCE A MAIL APPLICATION TO FORMAT A LONG EMAIL CONVERSATION FOR EASY CONSUMPTION

FIELD OF THE DISCLOSURE

The present application generally relates to processing of email data.

BACKGROUND OF THE DISCLOSURE

Email is used as the primary form of communication in most organizations, with limited features compared to newer thread-based communication systems such as Slack, provided by Slack Technologies of San Francisco, Calif. In particular, complex discussions involving multiple users over email may result in long, multi-threaded conversations with the same subject line, with multiple users responding to other users simultaneously or in a non-serial fashion. If a conversation participant is not closely following the multiple conversations within the discussion, it may be difficult or confusing to catch up with the discussion. Users may have to manually read each email in the discussion, which may be confusing with replies that are chronologically in order, but out of order for the conversation. In many instances, attachments may be included with an email, but not attached to replies to that email, requiring the user to find the specific email with the attachment in order to retrieve a file. Furthermore, long conversations may result in email "bloat", with each email including redundant copies of previous replies in the discussion. This may require additional storage space, utilize more memory on client devices, and require additional bandwidth for transmitting each email beyond that utilized for each new message.

BRIEF SUMMARY OF THE DISCLOSURE

The system and methods discussed herein provide for automatically generating conversation-based reports from email threads for easier and more intuitive user-consumption. A parser may identify all related emails, extract relevant portions of each email including embedded or in-line comments within quoted portions, and generate a single report document that presents the conversation in chronological order. Duplicate portions of each email are automatically removed and excluded from the report, reducing memory and bandwidth requirements, and also making the report more intuitive and easier to read. Attachments to the email may be included in the report, with additional deduplication to further reduce memory and bandwidth requirements.

In one aspect, the present disclosure is directed to a method for conversation-based report generation. The method includes retrieving, by a device, a plurality of email documents. The method also includes sorting, by the device, the plurality of email documents in a chronological order. The method also includes, for each email document of the plurality of email documents, extracting, by the device, a portion of a header of the email document; and extracting, by the device, a first portion of a body of the email document above a predetermined identifier in the body of the email document. The method also includes generating, by the device, a conversation report comprising, in the chronological order for each email document of the plurality of email documents, each extracted portion of the header of an email document and extracted first portion of the body of the email document.

In some implementations, the method includes receiving, by the device, a selection of an email document comprising a first subject; and identifying, by the device, the plurality of email documents from a database of email documents, responsive to each of the plurality of email documents having the first subject.

In some implementations, the method includes, for at least one email document of the plurality of email documents: identifying, by the device, a difference between a second portion of the body of the email document below the predetermined identifier in the body of the email document and a first portion of a body of a second email document above a predetermined identifier in the body of the second email document, and extracting, by the device, the identified difference. In such implementations, the method also includes generating the conversation report comprising the extracted identified difference. In a further implementation, the method includes extracting, by the device, a paragraph of the first portion of the body of the second email document prior to the identified difference; and generating the conversation report comprising the extracted paragraph of the first portion of the body of the second email document prior to the identified difference in a first format, and the extracted identified difference in a second, different format.

In some implementations, the predetermined identifier comprises a separator or a quote indicator. In some implementations, the method includes, for at least one email document of the plurality of email documents, identifying, by the device, a document attached to the email document; and generating the conversation report comprising a link to the identified attached document after the extracted first portion of the body of the corresponding email document. In a further implementation, the method includes identifying, by the device, a second document attached to a second email document, and determining, by the device, whether a difference exists between the document attached to the email document and the second document attached to the second email document. In a still further implementation, the method includes excluding, by the device, a link to the second document from the generated conversation report, responsive to a determination that a difference does not exist between the document attached to the email document and the second document attached to the second email document.

In some implementations, the method includes transmitting the conversation report to a second device.

In another aspect, the present disclosure is directed to a system for conversation-based report generation. The system includes a device executing a report generator configured to retrieve a plurality of email documents and sort the plurality of email documents in a chronological order. The report generator is also configured to, for each email document of the plurality of email documents, extract a portion of a header of the email document, and extract a first portion of a body of the email document above a predetermined identifier in the body of the email document. The report generator is also configured to generate a conversation report comprising, in the chronological order for each email document of the plurality of email documents, each extracted portion of the header of an email document and extracted first portion of the body of the email document.

In some implementations, the report generator is further configured to receive a selection of an email document comprising a first subject; and identify the plurality of email documents from a database of email documents, responsive to each of the plurality of email documents having the first subject.

In some implementations, the report generator is further configured to, for at least one email document of the plurality of email documents, identify a difference between a second portion of the body of the email document below the predetermined identifier in the body of the email document and a first portion of a body of a second email document above a predetermined identifier in the body of the second email document; and extract the identified difference. The report generator is also configured to generate the conversation report comprising the extracted identified difference. In a further implementation, the report generator is further configured to extract a paragraph of the first portion of the body of the second email document prior to the identified difference; and generate the conversation report comprising the extracted paragraph of the first portion of the body of the second email document prior to the identified difference in a first format, and the extracted identified difference in a second, different format.

In some implementations, the predetermined identifier comprises a separator or a quote indicator. In some implementations, the report generator is further configured to, for at least one email document of the plurality of email documents, identify a document attached to the email document. The report generator is also configured to generate the conversation report comprising a link to the identified attached document after the extracted first portion of the body of the corresponding email document.

In some implementations, the report generator is further configured to identify a second document attached to a second email document, and determine whether a difference exists between the document attached to the email document and the second document attached to the second email document. In a further implementation, the report generator is further configured to exclude a link to the second document from the generated conversation report, responsive to a determination that a difference does not exist between the document attached to the email document and the second document attached to the second email document.

In some implementations, the report generator is further configured to transmit the conversation report to a second device.

In still another aspect, the present disclosure is directed to a tangible computer-readable medium comprising instructions that, when executed by the processor of a device, cause the device to retrieve a plurality of email documents, and sort the plurality of email documents in a chronological order. Execution of the instructions further cause the device to, for each email document of the plurality of email documents, extract a portion of a header of the email document, and extract a first portion of a body of the email document above a predetermined identifier in the body of the email document. Execution of the instructions further cause the device to generate a conversation report comprising, in the chronological order for each email document of the plurality of email documents, each extracted portion of the header of an email document and extracted first portion of the body of the email document.

In some implementations, the medium further comprises instructions that, when executed by the processor of the device, cause the device to, for at least one email document of the plurality of email documents, identify a difference between a second portion of the body of the email document below the predetermined identifier in the body of the email document and a first portion of a body of a second email document above a predetermined identifier in the body of the second email document; and extract the identified difference. Execution of the instructions further cause the device to generate the conversation report comprising the extracted identified difference.

The details of various embodiments are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 2A is a table depicting header information for a plurality of emails of a conversation, according to some implementations;

FIG. 2B is an illustration of an example email of a conversation, according to some implementations;

FIG. 2C is an illustration of an example conversation report, according to some implementations;

Figure 1:
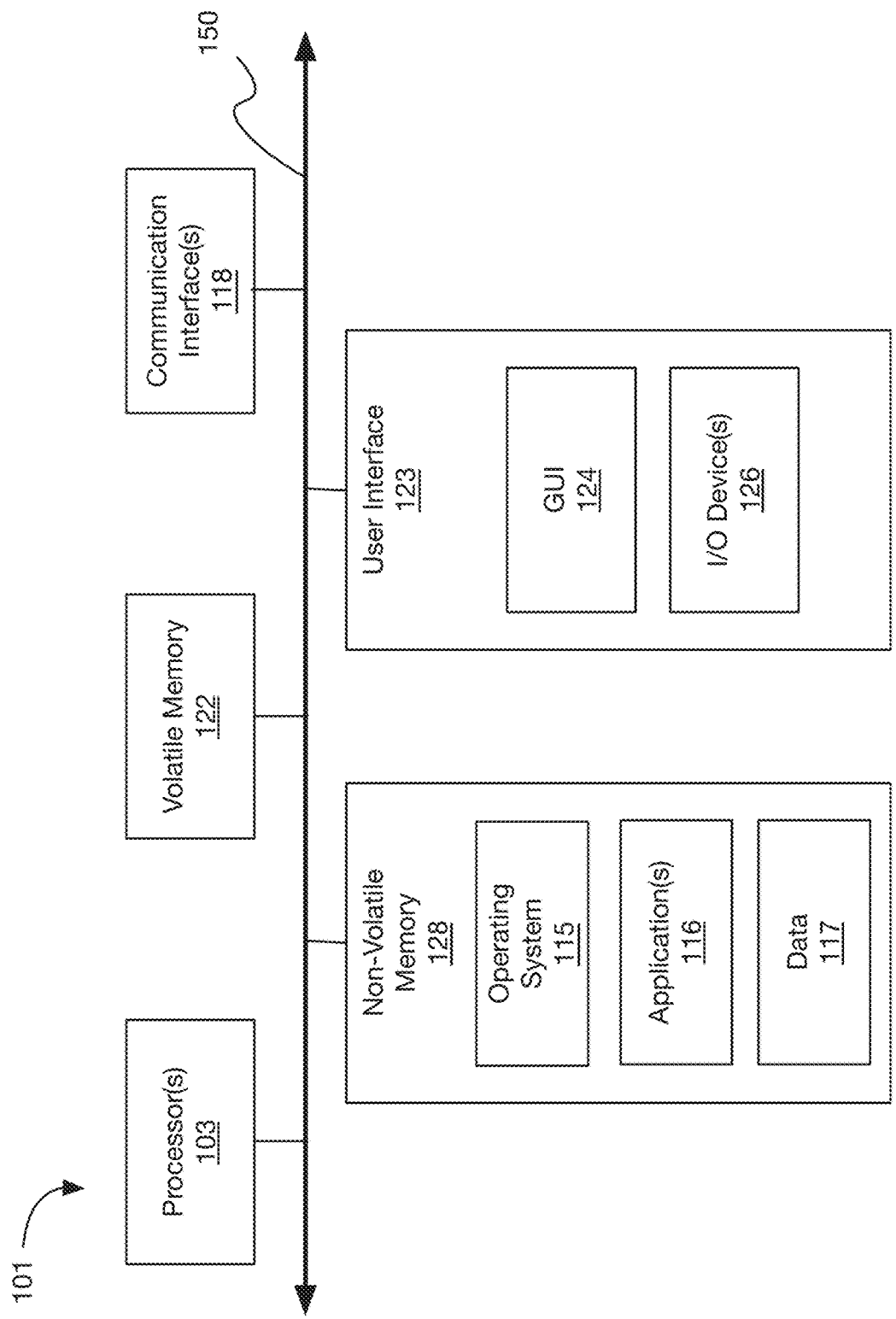
FIG. 1 is a block diagram illustrating an implementation of a computing device for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and
  Section B describes embodiments of systems and methods for conversation-based report generation.

A. Computing Environment

Prior to discussing the specifics of embodiments of the systems and methods for conversation-based report generation, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O devices(s) 126. Various elements of computer 101 may communicate via one or more communication buses, shown in communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor (s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" a be embodied in one or more application specific integrated circuits (ASICs), microprocessors, digital signal processors (DSPs) graphics processing units (GPUs), microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Conversation-based Report Generation

Email is used as the primary form of communication in most organizations, with limited features compared to newer thread-based communication systems such as Slack, provided by Slack Technologies of San Francisco, Calif. In particular, complex discussions involving multiple users over email may result in long, multi-threaded conversations with the same subject line, with multiple users responding to other users simultaneously or in a non-serial fashion. If a conversation participant is not closely following the multiple conversations within the discussion, it may be difficult or confusing to catch up with the discussion.

For example, FIG. 2A is a table 200 depicting originators, subject lines, and sent date and times for an example of plurality of emails in an implementation of a conversation, such information commonly found in message headers. Each email may be sent by different users or originators, but may have the same or a related subject line. In some implementations, a first subject line may omit the 're:' portion, or in other implementations, each successive email may include an additional 're:' portion, such as "re: re: re: project design", further increasing noise and user frustration.

Users may have to manually read each email in the discussion, particularly if they have been away and have to "catch up" with the conversation. This may be particularly confusing with replies that are chronologically in order, but out of order for the conversation. In many instances, attachments may be included with an email, but not attached to replies to that email, requiring the user to find the specific email with the attachment in order to retrieve a file.

Furthermore, long conversations may result in email "bloat", with each email including redundant copies of previous replies in the discussion. This may require additional storage space, utilize more memory on client devices, and require additional bandwidth for transmitting each email beyond that utilized for each new message. For example, FIG. 2B is an illustration of one email 202 of the example of FIG. 2A. As shown, the email may include a header portion 203, and a body portion 204. The body portion 204 may be further divided into a first portion 206 including data provided by the sender of the email 202, as well as a second portion 208 including quotes of previous messages in the conversation. The second portion 208 may include or be indicated via various identifiers, such as a separator or quote indicators (e.g. ">" 210). When a second portion 208 includes a previous email that itself quoted a further previous email, in some implementations as illustrated, such further emails may be identified via further quote indicators (e.g. ">>" 210). This may result from an email program that automatically quotes the entirety of a previous reply with such quote indicators, regardless of whether further previous replies were included. Because each email in the conversation may include one or more quoted previous emails, later emails in the conversation may be particularly large or have a high quote-to-original data ratio. In the illustrated example, the original data provided by the sender includes only four sentences (two of which are in-line with the quoted data, discussed below) and a signature line 218, with fifteen quoted lines illustrated (though many, many more may extend beyond the portion shown). Aside from being difficult and time-consuming consuming to read, these emails may require additional storage space and bandwidth to transmit between devices.

In many implementations, new or original data added by the sender of the email may not necessarily appear in the first portion 206, but may also include responses to questions or additional comments 216 added in-line with the quoted portion 208 as shown. In some implementations, these additional comments or responses 216 may be identified through the absence of a quote indicator 210, 212. In other implementations in which separators (e.g. horizontal lines) are used to separate the first portion 206 and second portion 208 of the body rather than quote indicators, these additional comments or responses 216 may not be as easily identified. In some such implementations, their presence may be potentially indicated by text within the first portion indicating the user has added further comments, such as text 214. Such text 214 may include "in-line", "in line", "added below", "appear below", "in the quoted portion", or other similar text.

In many implementations, the first portion 206 may also include additional text with minimal relevance to the conversation, such as a signature 218 or boilerplate added to each outgoing email address (e.g. a signature block, company logo, links to profiles, legal use text, copyright information, or any other such information that is unrelated to the conversation). Not only does this additional text add additional noise to the email, in many instances, it may be quite large and may be repeated in each quoted message, adding substantially to the amount of memory and bandwidth required for transmission and storage of the emails.

The system and methods discussed herein provide for automatically generating conversation-based reports from email threads for easier and more intuitive user-consumption. A parser may identify all related emails, extract relevant portions of each email including embedded or in-line comments within quoted portions, and generate a single report document that presents the conversation in chronological order. Duplicate portions of each email are automatically removed and excluded from the report, reducing memory and bandwidth requirements, and also making the report more intuitive and easier to read. Attachments to the email may be included in the report, with additional deduplication to further reduce memory and bandwidth requirements.

FIG. 2C is an illustration of an example conversation report 250 for the example conversation depicted in FIGS. 2A-2B, according to some implementations. As shown, original portions 254A-254C (sometimes referred to as first portions 254 of the body of the email, as opposed to quoted or second portions 208 of the body) of each email in the conversation may be extracted and added to the report in chronological order, along with a subset of header information 252A-252C for each corresponding email (e.g. originator or sender, and date/time information, with duplicative or irrelevant information such as subject line and to and carbon copy information excluded).

In implementations in which an email includes additional comments 216 in-line, these comments may be extracted and included in the report with the corresponding first portion 254 (e.g. comments 258). In some implementations for clarity, a line or paragraph of the prior immediately prior to an additional comment 216 may also be extracted and included (e.g. lines 256). In some implementations, these additional lines or paragraphs 256 may be formatted differently from comments 258 to indicate that they are quotes. In a further implementation, the originator of the quoted lines or paragraphs 256 may be identified from the prior email, and may be included in the additional lines or paragraphs 256 as shown.

In some implementations, additional comments 216 may be identified responsive to the presence of an indicator 214 in the first portion 204 of an email, or responsive to the lack of quote indicators (210, 212) on corresponding lines within the second portion 206. In other implementations, the system may determine a difference between the second portion 206 and the body 203 of the prior email. A fully quoted email with no additional comments will have no differences, while an email with added comments will have the added comments as differences. By calculating a difference between the second portion 206 of an email and the body 203 of the prior email, the system may automatically identify and extract these comments, while removing quoted portions of the email, quoted portions of earlier emails, signature lines, boilerplate, etc. This difference may be calculated via any appropriate means, such as a line-by-line, word-by-word, or byte-by-byte XOR.

In some implementations, links to attachments included in an email 260 may also be included in the generated conversation report 250, and may be placed in line with the extracted portions of the corresponding email as shown. In some implementations, the attachments may be provided with the report (e.g. for transmission to a second device), while in other implementations, the links may comprise a uniform resource locator (URL) or address at which the attachment may be retrieved (e.g. from a file server, network storage location, cloud storage location, or other such storage). As discussed above, in some instances, multiple copies of the same attachments may be included in emails in the conversation thread (e.g. if a second user replies to an email with attachments and selects, either accidentally or intentionally, to include the attachments). In some implementations, the system may identify that the attachment has been previously included in the conversation report, and may exclude further links to the attachment to avoid confusion. However, in some instances, the additional copies of the attachments may be modified by a user (and including the copy with an email may thus be intentional). To avoid accidentally excluding such copies, in some implementations, the system may determine a difference between the original attachment and the copy of the attachment (e.g. by comparing hashes of both files, such as MD5 hashes; by performing a line-by-line, word-by-word, or byte-by-byte XOR on the files; or any other such means). If the system detects no differences, then the copy may be excluded from the report; if the system does determine a difference, then the copy may be included in the report (and, in some implementations, identified with an indicator such as "modified").

Figure 3:
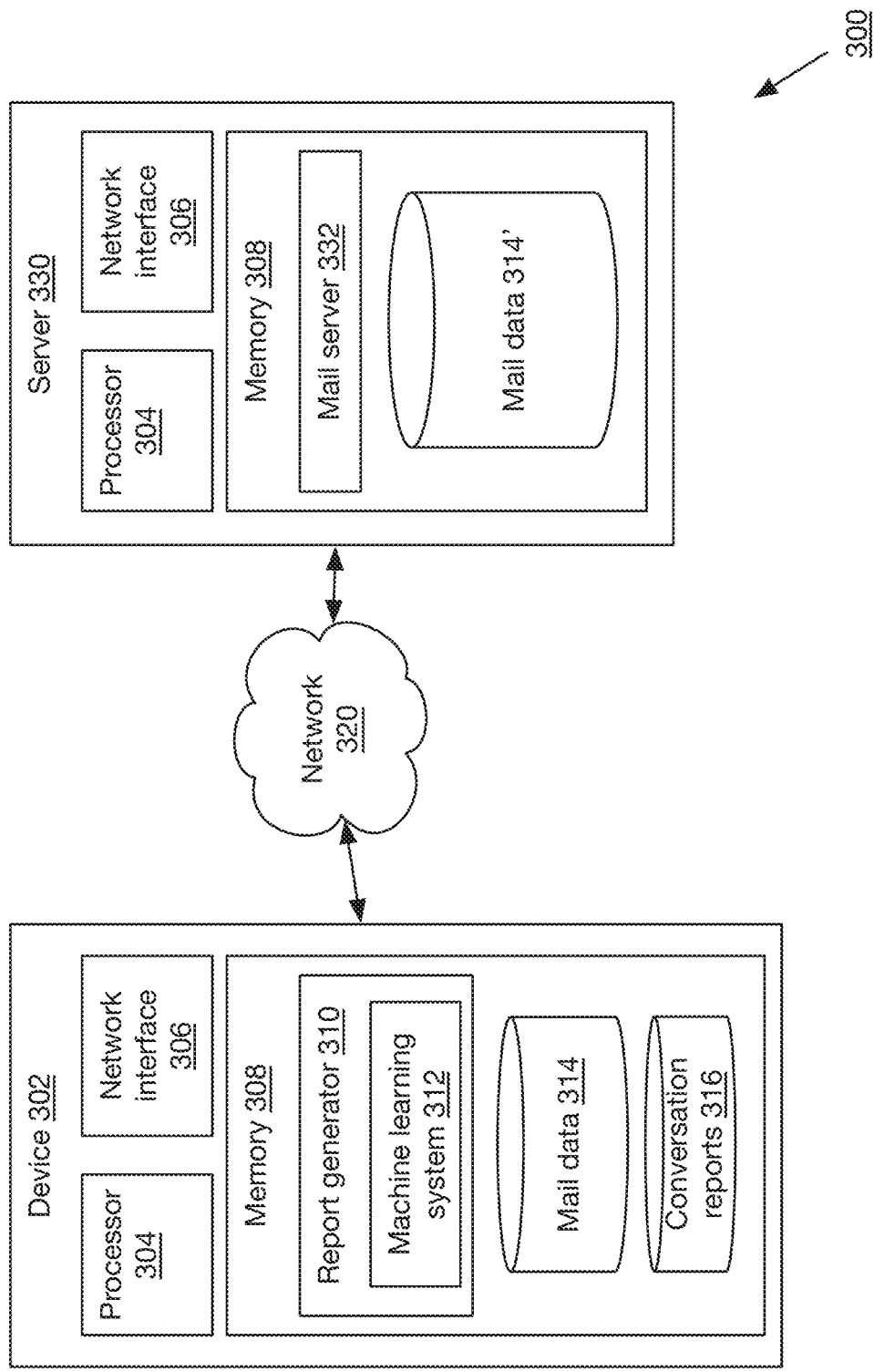
FIG. 3 is a block diagram of an implementation of a system for conversation-based report generation.

FIG. 3 is a block diagram of an implementation of a system for conversation-based report generation. A device 302, sometimes referred to as a user device, client device, or by other such terms, may communicate with a server 330, sometimes referred to as an application server, mail server, Exchange server, or by other such terms, via a network 320. Although only one device 302 is illustrated, in many implementations, multiple devices 302 may communicate with each other and/or with a server 330 via one or more networks 320.

Device 302 may comprise a laptop computer, desktop computer, tablet computer, wearable computer, smart phone, console, smart television, embedded computer, workstation, or any other type and form of computing device. In some implementations, device 302 may comprise a virtual machine executed by one or more hardware machines and communicating with another computing device for display to a user (e.g. via a remote desktop protocol). Device 302 may be any type of device 101 discussed above, and may comprise one or processors 304 (which may be similar to processors 103 discussed above); network interfaces 306 (which may be similar to communications interfaces 118 discussed above); and memory devices 308 (which may be similar to memory 122, 128 discussed above).

Memory 308 may include a report generator 310, which may comprise an application, service, server, daemon, routine, or other executable logic for parsing and analyzing emails and attachments and generating conversation-based reports. Report generator 310 may sometimes be referred to as a parser, analyzer, or extractor. Although shown on device 302, in some implementations, report generator 310 may be executed by a second device 302 or by mail server 330 and accessed by device 302. For example, device 302 may transmit a request for a report to mail server 330, which may execute a report generator 310 to generate a report for a selected conversation, and then provide the report in response.

In some implementations, report generator 310 may retrieve and parse emails of a conversation via predetermined character-based or word-based matching via a match to a regular expression (regex) string. For example, report generator 310 may use a regex to identify separators or quote indicators in an email, such as horizontal lines (either continuous or from a string of dashes, emdashes, or underlined spaces, or similar elements), or quote indicators (e.g. ">" or similar indicators). In some implementations, report generator 310 may compare a body of an email to a prior email to identify differences to include in a report. In some implementations, report generator 310 may compare the body of the email to each prior email, in case of replies that are out of chronological order (e.g. emails ABCD, in which C is a reply to B, and D is a reply to A). The comparison may be performed on a byte-by-byte basis, word-by-word basis, line-by-line basis, or paragraph-by-paragraph basis, in various implementations. In particular, these latter comparisons may be less accurate, but may be significantly faster, reducing the processor resources and memory required for analysis. However, as users may rarely modify lines in a reply to an email message, such line-by-line or paragraph-by-paragraph analysis may be adequate.

In some implementations, report generator 310 may incorporate a machine learning system 312, such as a neural net or regression-based analyzer. Machine learning may be particularly useful to identify when users have provided in-line replies to messages based on signals within the body of their message. Inputs to the machine learning network may comprise the first portion of an email message (e.g. above a separator), which may be divided into sentences or lines (e.g. separated by periods, questions marks, exclamation points, or other punctuation; or separated by carriage returns or line feed indicators), and outputs of the network may include indicators for whether in-line responses are present or not in the second portion of the body of the email. If responses are present, in some instances, the second portion of the email may be compared to one or more prior emails to identify added portions that comprise replies for inclusion in a conversation-based report. Thus, for example, the machine learning system 312 may be used to trigger difference comparison and extraction.

Report generator 310 may utilize mail data stored in a local database 314 or in a database 314' maintained by a server 330. In some implementations, a local database 314 may comprise a subset of mail data maintained in database 314' (e.g. retrieved upon demand or pushed by a mail server 332 to the device). Mail data 314, 314' may be stored in any appropriate data structure, such as a database, flat file, compressed archive, or any other such data. Mail data may include attachments, in some implementations, while in other implementations, mail data may include pointers or links to attachments stored separately.

Conversation reports may be stored in a database 316 maintained by report generator 310. Database 316 may be in any format, such as a flat file, relational database, or other data structure. In many implementations, conversation reports may be generated as XML data files, with tags identifying users and/or message dates and times, as well as providing formatting for replies and quoted portions of other replies for in-line responses.

In some implementations, a server 330 may execute a mail server 332. Mail server 332 may comprise an application, service, daemon, routine, or other executable logic for sending, receiving, and storing email data, including attachments, as well as other related data (e.g. calendar appointments, notes, tasks, or other such data). Mail server 332 may store data locally (e.g. in mail database 314') or may store data in one or more data servers (not illustrated).

Figure 4:
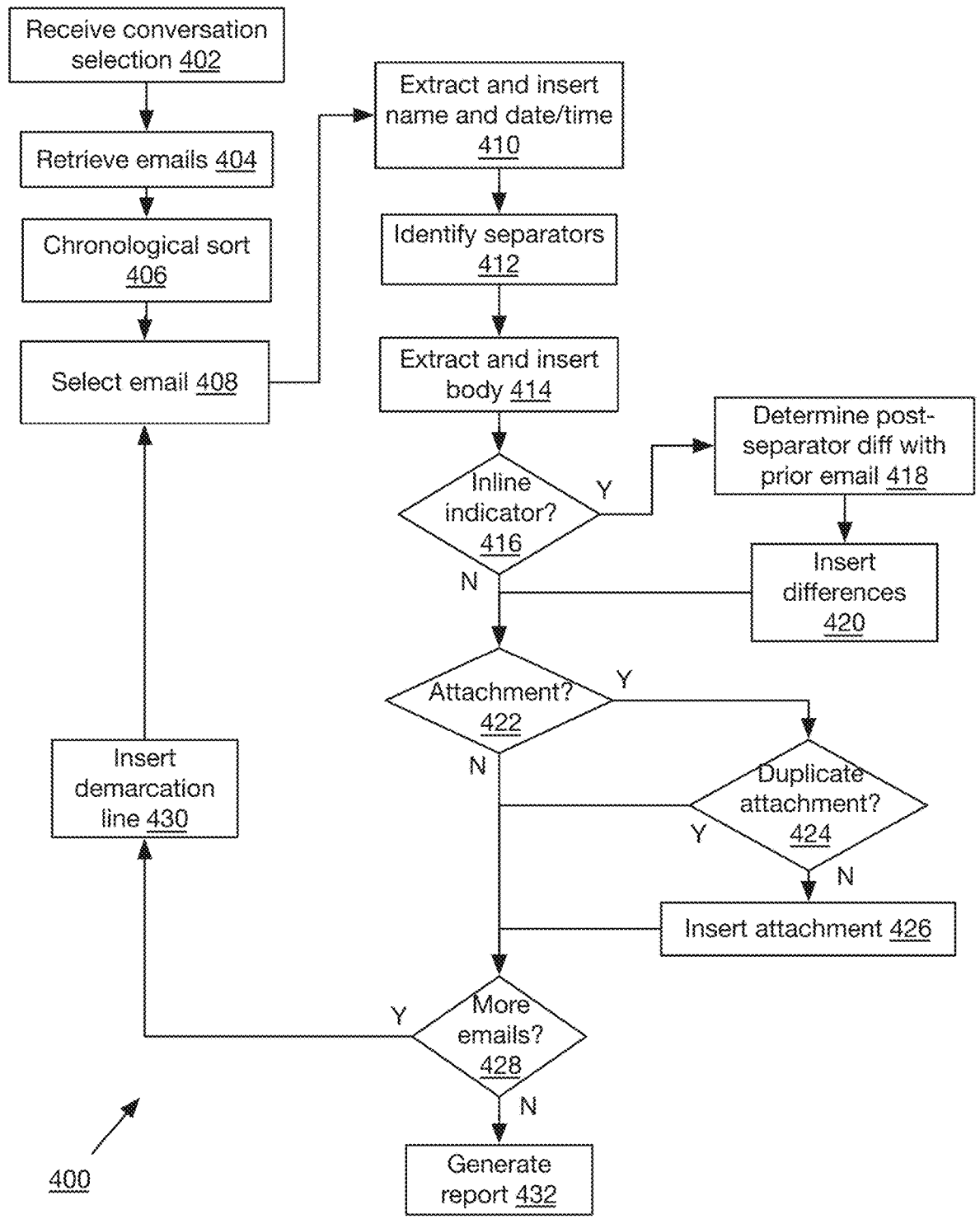
FIG. 4 is a flow chart of an implementation of a method for conversation-based report generation.

FIG. 4 is a flow chart of an implementation of a method 400 for conversation-based report generation. At step 402, a device or report generator executed by a device may receive a selection of an email conversation. The selection may be received from a user of the device, e.g. via a graphical or text user interface of report generator 310; or may be received in a request from another device (e.g. in a request packet, with a conversation identified in a payload or header of the request). Requests from another device may be via any suitable protocol, such as a RESTful request (e.g. HTTP POST or GET request comprising a parameter-value pair identifying a conversation).

At step 404, the report generator or device may retrieve emails corresponding to the selected conversation. Conversations may be identified according to a subject line or entry. In implementations in which a selected conversation includes a subject line having one or more predetermined indicators (e.g. "fwd:" or "re:"), the indicators may be removed to identify a "base" conversation subject (typically indicating the first message in the conversation). Other emails related to the conversation may be identified via similar subject lines or entries, with or without one more indicators (including multiple indicators, such as "re: re: re:", etc.). Related emails may be retrieved from a local database or remotely from a mail server and/or data server.

At step 404, in some implementations, the report generator or device may chronologically sort the retrieved emails. In other implementations, the retrieved emails may already be in chronological order, and sorting may be skipped. In many implementations, the generated report may be ordered chronologically for ease of reading. However, in other implementations, the generated report may be ordered by sub-conversation within the conversation; for example, in many instances, a conversation may have multiple sub-conversations as multiple people reply to an initial email, and then others reply to those replies separately, creating a forked chain of emails within the conversation. Accordingly, in some such implementations, the generated report may be divided into sub-conversations, each ordered chronologically, separate from other chronological responses in the chain. Sub-conversations may be identified by the system by identifying the sender of a prior reply (e.g. a message quoting a second message, with the second message sender potentially indicating a sub-conversation). If multiple emails quote the same message directly, then the report generator or device may split the conversation report into sub-conversations, and process each sub-conversation as if it were its own conversation. In one implementation, this may be done by associating each email of a plurality of emails replying to a single email with an identifier (e.g. a first email replying to a prior email may be identified as chain "A", and a second email replying to the prior email may be identified as chain "B"). The identifier may be appended to the email, e.g. in the header such as within the subject line (e.g. "re: business idea [A]"). These identifiers may be inherited by further emails replying to each identified email: for example, a third email replying to the first email above would then have the subject line "re: business idea [A]" (further splits may be indicated via extensions of the identifiers, e.g. [AA], [AB], etc.). In some implementations, these identifiers may be added by the mail server when emails are created, while in other implementations, the report generator may parse the chain of emails in chronological order to identify each split in the conversation and add identifiers accordingly. Once complete, the report may be generated according to method 400 iteratively for each sub-conversation.

At step 408, the report generator or device may select a first email in the conversation (or sub-conversation for implementations that separate out sub-threads of the conversation). The first email may be the earliest or oldest email in the conversation or sub-conversation in chronological order (e.g. having an oldest creation or sending time and date). At step 410, the report generator or device may extract the sender name (e.g. from a 'from' field of the message header) and the time and date (e.g. from a 'sent' field of the message header), and may insert the extracted name and time and date into a conversation report. In some implementations, extracting the sender name may comprise extracting the email address of the sender, the user name of the sender, or a reply-to address within the message header.

At step 412, the report generator or device may identify a separator in the body of the selected email between a first portion comprising text added by the sender to the email, and a second portion comprising quotes from one or more prior emails. The separator may be identified via a regex or a similar technique, and may include one or more predetermined characters or entities (e.g. horizontal lines, dashes, etc.). In some implementations, the separator may be implicit and may be indicated by the presence of a header of the quoted email (e.g. a "from" field from the sender of the prior email, or similar fields).

At step 414, the report generator or device may extract a first portion of the body of the email above the separator (comprising the text added by the sender) and insert the first portion into the conversation report after the extracted name and date and time. In some implementations, the inserted portion may be formatted differently from the name and date/time, such as indented or offset, in a different font or size, or otherwise differentiated.

At step 416, in some implementations, the report generator or device may determine whether there is an indicator of inserted text within the quoted previous message (e.g. in-line responses to questions). The indicator may comprise text such as "in-line" or "in line" or "responses below" or similar indicators, and may be determined variously via a regex or according to a signal from a machine learning system from an input of the extracted first portion of the body of the email. If there is inserted text, at step 418, the report generator or device may determine a difference between the second portion of the body of the email (comprising quoted earlier emails and additional inserted in-line responses) and the previous email (comprising the earlier emails without the inserted in-line responses). At step 420, the identified differences may be inserted into the conversation report. In some implementations, a prior line or paragraph from the second portion of the body of the email may also be inserted into the conversation report, to provide context for the inserted in-line response. This prior line or paragraph may be formatted differently in the conversation report to clarify that it was quoted from prior emails.

As discussed above, in some instances, users may reply to earlier emails in a conversation, rather than an immediately prior email chronologically (e.g. when a first user replies to an email at one time, and then a second user replies to the same email at a later time). If at step 418, only the immediately prior email in chronological order is compared to the new email to determine differences, this may result in errors (e.g. with added text from the intervening user). Thus, in some implementations at step 418, the report generator or device may first identify an email to which the selected email or email being processed was a reply. This may be done in some implementations by identifying a first or top-most header in the second (quoted) portion of the body of the selected email. The top-most header may include fields that may be used to identify the replied-to email, such as from and sent date/time fields. Once the replied-to email is identified, the report generator or device may determine a difference at step 418 and insert any identified differences into the conversation report at step 420. In some implementations, this may be done for every email and step 416 may be skipped (e.g. proceeding from step 414 to step 418 for each email). In still other implementations, steps 416-420 may be skipped.

At step 422, the report generator or device may determine whether the email includes any attachments (or includes a link or pointer to an attachment). If so, in some implementations, at step 424, the report generator or device may determine whether the attachment is a duplicate—i.e. has been previously included in the conversation report as a result of being attached to a previously processed email. If not, then the attachment or a link or pointer to the attachment may be added to the conversation report at step 426.

Duplicate attachments may be identified at step 424 based on having similar names, having similar addresses within storage, or any other such method. However, in some instances, users may attach revised versions of earlier attachments to emails without modifying the filename. To address this, in some implementations, at step 424, the report generator or device may compare the contents of the attached file to prior attached files to determine whether it has been modified (e.g. by comparing MD5 hashes of the files, by comparing the files on a byte-by-byte or word-by-word basis, etc.). If the file is not a duplicate of the earlier attached file, then it may be included in the report at step 426.

At step 428, the report generator or device may determine if there are additional emails in the conversation or sub-conversation to be processed. If so, then at step 430 in some implementations, a demarcation line may be inserted into the conversation report (e.g. horizontal line or other indicator), and steps 408-428 may be repeated iteratively for each additional email.

At step 432, once complete, the conversation report may be finalized (e.g. adding a header or other summary identifying the processed emails or the report generation time, or other such information), and the report may be provided to the requestor (e.g. the user of the device, or a second device that provided a request for a conversation report to the device). The report may be transmitted to a second device, mail server, or other entity for subsequent display, print-out, or other use.

Accordingly, conversation-based summary reports of email conversations may be generated dynamically, including processing of in-line responses to questions and attachments, resulting in a single, easy to follow, intuitive summary of the conversation and/or sub-conversations. With the removal of additional quoted portions, signatures, headers, and boilerplate portions that may be repeated with each email in the thread, the resulting conversation-based summary report may be significantly smaller than the individual emails, reducing storage space and bandwidth required to store and transmit the conversation to a user device. The systems and methods discussed herein may be particularly useful for legacy systems that do not present conversation-based threaded views of email, providing functionality previously unavailable to these systems.

In should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and that these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code languages such as JAVA. The software programs or executable instructions may be stored on or in one or more articles of manufacture as object code.

While the foregoing writing description of the methods and systems enable one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufactured using programmable and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMS, ROMs, PROMs, RAMs, SRAMs, etc.), hardware (e.g., integrated circuit chip, Field Programmable Gate Array (FPGA), Application Specified Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The articles of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described method and systems. Thus, the scope of the methods and systems described herein should not be limited by any of the illustrative embodiments and should be defined in accordance with the accompanying claims and their equivalents.

What is claimed is:

1. A method for conversation-based report generation, comprising:
   retrieving, by a device, a plurality of email documents;
   sorting, by the device, the plurality of email documents in a chronological order;
   for each email document of the plurality of email documents:
      extracting, by the device, a portion of a header of the email document, and
      extracting, by the device, a first portion of a body of the email document above a predetermined identifier in the body of the email document;
   for at least one email document of the plurality of email documents:
      identifying, by the device, a difference between a second portion of the body of the email document below the predetermined identifier in the body of the email document and a first portion of a body of a second email document above a predetermined identifier in the body of the second email document, and
      extracting, by the device, the identified difference; and
   generating, by the device, a conversation report comprising, in the chronological order for each email document of the plurality of email documents, each extracted portion of the header of the email document and extracted first portion of the body of the email document, and comprising the extracted identified difference for the at least one email document.

2. The method of claim 1, further comprising:
   receiving, by the device, a selection of a third email document comprising a first subject; and identifying, by the device, the plurality of email documents from a database of email documents, responsive to each of the plurality of email documents having the first subject.

3. The method of claim 1 further comprising:
extracting, by the device, a paragraph of the first portion of the body of the second email document prior to the identified difference; and
wherein generating the conversation report further comprises generating the conversation report comprising the extracted paragraph of the first portion of the body of the second email document prior to the identified difference in a first format, and the extracted identified difference in a second, different format.

4. The method of claim 1, wherein the predetermined identifier comprises a separator or a quote indicator.

5. The method of claim 1, further comprising:
for at least one email document of the plurality of email documents:
identifying, by the device, a document attached to the email document; and
wherein generating the conversation report further comprises generating the conversation report comprising a link to the identified attached document after the extracted first portion of the body of the email document with the attached document.

6. The method of claim 5, further comprising:
identifying, by the device, a second document attached to the second email document, and
determining, by the device, whether a difference exists between the document attached to the email document and the second document attached to the second email document.

7. The method of claim 6, further comprising:
excluding, by the device, a link to the second document from the generated conversation report, responsive to a determination that a difference does not exist between the document attached to the email document and the second document attached to the second email document.

8. The method of claim 1, further comprising transmitting the conversation report to a second device.

9. A system for conversation-based report generation, comprising:
a computing device comprising a processor executing a report generator configured to:
retrieve a plurality of email documents;
sort the plurality of email documents in a chronological order;
for each email document of the plurality of email documents:
extract a portion of a header of the email document, and
extract a first portion of a body of the email document above a predetermined identifier in the body of the email document;
for at least one email document of the plurality of email documents:
identify a difference between a second portion of the body of the email document below the predetermined identifier in the body of the email document and a first portion of a body of a second email document above a predetermined identifier in the body of the second email document, and
extract the identified difference; and
generate a conversation report comprising, in the chronological order for each email document of the plurality of email documents, each extracted portion of the header of the email document and extracted first portion of the body of the email document, and comprising the extracted identified difference for the at least one email document.

10. The system of claim 9, wherein the report generator is further configured to:
receive a selection of a third email document comprising a first subject; and
identify the plurality of email documents from a database of email documents, responsive to each of the plurality of email documents having the first subject.

11. The system of claim 9, wherein the report generator is further configured to:
extract a paragraph of the first portion of the body of the second email document prior to the identified difference; and
generate the conversation report comprising the extracted paragraph of the first portion of the body of the second email document prior to the identified difference in a first format, and the extracted identified difference in a second, different format.

12. The system of claim 9, wherein the predetermined identifier comprises a separator or a quote indicator.

13. The system of claim 9, wherein the report generator is further configured to:
for at least one email document of the plurality of email documents:
identify a document attached to the email document; and
generate the conversation report comprising a link to the identified attached document after the extracted first portion of the body of the email document with the attached document.

14. The system of claim 13, wherein the report generator is further configured to:
identify a second document attached to the second email document, and
determine whether a difference exists between the document attached to the email document and the second document attached to the second email document.

15. The system of claim 14, wherein the report generator is further configured to:
exclude a link to the second document from the generated conversation report, responsive to a determination that a difference does not exist between the document attached to the email document and the second document attached to the second email document.

16. The system of claim 9, wherein the report generator is further configured to transmit the conversation report to a second device.

17. A non-transitory computer-readable medium comprising instructions that, when executed by the processor of a device, cause the device to:
retrieve a plurality of email documents;
sort the plurality of email documents in a chronological order;
for each email document of the plurality of email documents:
extract a portion of a header of the email document, and
extract a first portion of a body of the email document above a predetermined identifier in the body of the email document;
for at least one email document of the plurality of email documents:
identify a difference between a second portion of the body of the email document below the predetermined identifier in the body of the email document and a first portion of a body of a second email document above a predetermined identifier in the body of the second email document, and extract the identified difference; and generate a conversation report comprising, in the chronological order for each email document of the plurality of email documents, each extracted portion of the header of the email document and extracted first portion of the body of the email document, and comprising the extracted identified difference for the at least one email document.

\* \* \* \* \*